United States Patent
Cheng et al.

(10) Patent No.: US 11,579,042 B2
(45) Date of Patent: Feb. 14, 2023

(54) MONITORING METHOD FOR PLATE BILLET CRANK FLYING SHEAR PROCESS

(71) Applicants: Aktiebolaget SKF, Gothenburg (SE); SKF (China) Co Ltd, Shanghai (CN)

(72) Inventors: Gang Cheng, Shanghai (CN); Shibai Liao, Shanghai (CN); Feng Lin, Shanghai (CN)

(73) Assignee: Aktiebolaget SKF, Gothenburg (SE)

(*) Notice: Subject to any disclaimer, the term of this patent is extended or adjusted under 35 U.S.C. 154(b) by 0 days.

(21) Appl. No.: 17/401,990

(22) Filed: Aug. 13, 2021

(65) Prior Publication Data
US 2022/0082472 A1      Mar. 17, 2022

(30) Foreign Application Priority Data
Sep. 10, 2020 (CN) .......................... 202010945228.3

(51) Int. Cl.
*G01M 13/028* (2019.01)
*B21B 15/00* (2006.01)

(52) U.S. Cl.
CPC ....... *G01M 13/028* (2013.01); *B21B 15/0007* (2013.01)

(58) Field of Classification Search
CPC ...... G01M 13/028; G01M 7/00; G01M 13/00; B21B 15/0007
See application file for complete search history.

(56) References Cited

U.S. PATENT DOCUMENTS

| 2012/0198978 A1* | 8/2012 | Shen | B23D 25/12 83/78 |
| 2015/0343515 A1* | 12/2015 | De Luca | B65G 11/203 193/31 A |
| 2020/0166909 A1* | 5/2020 | Noone | G06N 20/00 |

(Continued)

FOREIGN PATENT DOCUMENTS

| CN | 202239394 U | * | 5/2012 |
| CN | 203738119 U | * | 7/2014 |

(Continued)

OTHER PUBLICATIONS

Nikula et. al., "Roller Leveler Monitoring Using Acceleration Measurements and Models for Steel Strip Properties", Machines 2020, 8, 43; doi:10.3390/machines8030043 (Year: 2020).*

(Continued)

*Primary Examiner* — Stephanie E Bloss
(74) *Attorney, Agent, or Firm* — Garcia-Zamor Intellectual Property Law; Ruy Garcia-Zamor; Bryan Peckjian

(57) ABSTRACT

The present invention provides a monitoring method for a plate billet crank flying shear process, including: acquiring a control signal of a control system of a crank flying shear device, and determining a cutting stage of the crank flying shear process according to the control signal; obtaining an actual cutting edge speed curve in the cutting stage, and further dividing the cutting stage into multiple sub-processes according to the actual cutting edge speed curve; obtaining actual data of a parameter related to the crank flying shear process, and for one or more of the multiple sub-processes, separately comparing the actual data of the parameter with typical data of the parameter, in order to estimate an abnormality risk.

12 Claims, 2 Drawing Sheets

(56) References Cited

U.S. PATENT DOCUMENTS

2020/0201292 A1* 6/2020 Cella .................. G05B 23/0221
2020/0348662 A1* 11/2020 Cella ...................... G06N 3/088

FOREIGN PATENT DOCUMENTS

| CN | 105195807 | A | * | 12/2015 | |
|----|-----------|---|---|---------|--|
| CN | 106077805 | A | * | 11/2016 | |
| CN | 106311749 | A | * | 1/2017  | |
| CN | 208944829 | U | * | 6/2019  | |
| CN | 111250777 | A | * | 6/2020  | |
| CN | 111681227 | A | * | 9/2020  | |
| CN | 111735620 | A | * | 10/2020 | |
| CN | 111804736 | A | * | 10/2020 | ............... B21B 1/18 |
| CN | 112139251 | A | * | 12/2020 | ......... B21B 15/0007 |

OTHER PUBLICATIONS

Zhou et. al., "Nonlinear fault detection for batch processes via improved chordal kernel tensor locality preserving projections", Control Engineering Practice 101 (2020) 104514 (Year: 2020).*

* cited by examiner

MONITORING METHOD FOR PLATE BILLET CRANK FLYING SHEAR PROCESS

CROSS-REFERENCE TO RELATED APPLICATIONS

This application claims priority to Chinese patent application no. 202010945228.3, filed Sep. 10, 2020, the contents of which is fully incorporated herein by reference.

TECHNICAL FIELD

The present invention relates to a monitoring method for a plate billet crank flying shear process.

BACKGROUND ART

Crank flying shear processes/devices are key processes/devices that are commonly seen on hot-rolling production lines. Due to their unique intermittent rotation conditions and high impact load, many failure modes arise. From the perspective of economy and production, unplanned shutdowns will result in huge losses. Furthermore, faults in crank flying shear machines will cause massive economic losses and casualties among personnel. However, due to the distinctive features of crank flying shear devices, with an unstable operating state and a large transient impact, existing solutions based on voltage and temperature, etc. are unable to effectively monitor and diagnose these crank flying shear processes and devices. Thus, at the present time there is still no perfect and effective monitoring system and method. Moreover, there is still no state monitoring solution for crank flying shear region monitoring. Manual spot checks and excessive preventive maintenance are generally employed.

SUMMARY OF THE INVENTION

In view of the above, the present invention provides a monitoring method for a plate billet crank flying shear process, the method comprising: acquiring a control signal of a control system of a crank flying shear device, and determining a cutting stage of the crank flying shear process according to the control signal; obtaining an actual cutting edge speed curve in the cutting stage, and further dividing the cutting stage into multiple sub-processes according to the actual cutting edge speed curve; obtaining actual data of a parameter related to the crank flying shear process, and for one or more of the multiple sub-processes, separately comparing the actual data of the parameter with typical data of the parameter, in order to estimate an abnormality risk.

According to the present invention, having already used several basic sensors to detect the states of certain key components, key parameters are also obtained from an iba system at the same time, and parameter data is used to determine and divide different stages, including a head-cutting stage, a tail-cutting stage and a transition process. For each stage, external sensor data and parameter data are combined in order to extract key indices and diagnostic rules of key crank flying shear components. Thus, the present invention provides a new solution for a crank flying shear machine, which is very important for a metal hot-rolling process.

DETAILED DESCRIPTION OF THE INVENTION

Figure 1:
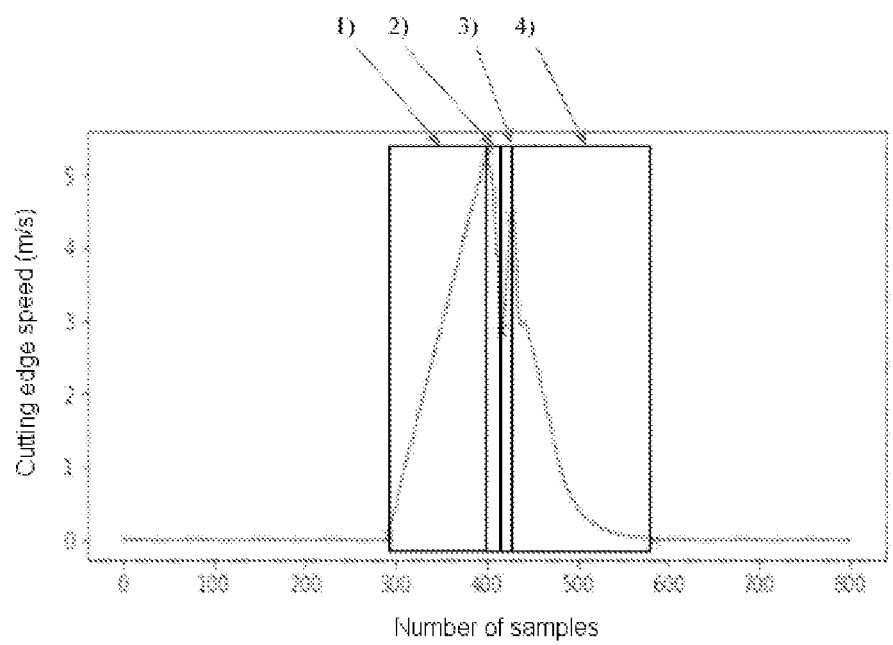
FIG. 1 is a schematic diagram of multiple sub-processes divided for a head-cutting stage according to a preferred embodiment of the present invention.

Crank flying shear is a process stage of hot rolling, situated between rough rolling and fine rolling, for cutting a roughly-rolled high-temperature plate billet (e.g. a steel billet) into a neat segment. This is because the rough rolling process will result in the head and tail portions of the plate billet having a protruding or sunken shape, which is not at all neat. The crank flying shear process can cut away the uneven parts of the head and tail portions of the plate billet. Thus, the crank flying shear process generally comprises cutting stages such as a head-cutting stage and a tail-cutting stage, as well as a transitional stage between the head-cutting stage and tail-cutting stage, wherein the head-cutting stage is used to cut off the head portion of the plate billet, the tail-cutting stage is used to cut off the tail portion of the plate billet, and in the transitional stage the plate billet moves in the crank flying shear device without being cut.

In the case of the crank flying shear process, an iba system (which is a process data collection system commonly used in the art) or any other suitable process data collection system can be used to obtain data of parameters related to the crank flying shear process. Parameters related to the crank flying shear process for example include but are not limited to: control signals of the crank flying shear device; signals obtained from the process data collection system such as the iba system and sensors thereof, e.g. cutting edge position, plate billet position, cutting edge speed and temperature signals; vibration data and and motor current data obtained from a motor, gearbox, drive shaft and bearings, etc. of a cutting edge driving means of the crank flying shear device; and/or lubricant data obtained from a lubrication system of the crank flying shear device, e.g. lubricant flow rate, lubricant pressure and lubricant supply frequency; and so on. In some existing techniques, vibration and temperature serve as a basis for monitoring whether the crank flying shear device and process are normal.

However, in the crank flying shear process, unstable and intermittent operating conditions and large transient load impact situations will sometimes arise, and both such situations will make conventional monitoring based on vibration and temperature ineffective. Thus, the present invention proposes a monitoring method to solve these two key problems, and can be used to detect other abnormality risks and fault causes in crank flying shear processes and devices.

According to a preferred embodiment, the monitoring method of the present invention comprises a precise operating condition segmentation method based on cutting edge cutting speed, which can comprise the two levels described below; and after segmentation, processing and monitoring parameters related to the crank flying shear process, in order to judge an abnormality risk, or even determine the cause of a fault.

First, a cutting stage of the crank flying shear process is determined according to a control signal of a control system (which is for example a distributed control system) of the crank flying shear device; the cutting stage for example comprises the head-cutting stage and/or tail-cutting stage as mentioned above. The control signal is for example a start/stop signal of the crank flying shear device; based on the start/stop signal, the crank flying shear device will automatically implement a complex operation such as driving the cutting edge or feeding the plate billet. Thus, it could be said that the control signal specifies the time sequence of the crank flying shear process.

Secondly, it is possible to further obtain an actual cutting edge speed curve in the cutting stage, and based on the actual cutting edge speed curve, further divide the cutting stage again more precisely, as described below for the head-cutting stage and tail-cutting stage. The actual cutting edge speed curve is formed by means of actual cutting edge speed data; the actual cutting edge speed data is obtained in a single cutting process by means of the process data collection system of the crank flying shear device, e.g. obtained in real time by means of the iba system or any other suitable process data collection system. Preferably, actual cutting edge speed data can be acquired at a certain sampling time interval, e.g. actual cutting edge speed data is collected once every 0.01 s, so as to obtain the actual cutting edge speed curve.

In the case of the head-cutting stage, preferably, this can be further divided into the following multiple sub-processes according to the actual cutting edge speed curve: 1) an acceleration/preparation process, 2) a cutting-in process, 3) a cutting-away process, 4) a deceleration process. Specifically, in 1) the acceleration/preparation process, the cutting edge is accelerated by the cutting edge driving means of the crank flying shear device and is about to cut the head portion of the plate billet; in 2) the cutting-in process, the cutting edge contacts and cuts into the plate billet; in 3) the cutting-away process, the cutting edge cuts through the plate billet and leaves the plate billet; and in 4) the deceleration process, the cutting edge moving at high speed is decelerated, for use in the next cutting. An example of such division is shown in FIG. 1, wherein the vertical coordinates represent (m/s), and the horizontal coordinates represent the number of sampling points. As will be understood, the number of sampling points increases with time, so is also equivalent to a kind of time sequence.

It should be noted that, because the plate billet is always moving in the crank flying shear process, the cutting edge needs to be lifted quickly after the head-cutting stage ends, in order to prevent the cutting edge from obstructing movement of the plate billet or damaging the plate billet. Moreover, in the tail-cutting stage, because the plate billet will move away from the crank flying shear device, the movement of the cutting edge in the tail-cutting stage is somewhat different from the movement of the cutting edge in the head-cutting stage.

Figure 2:
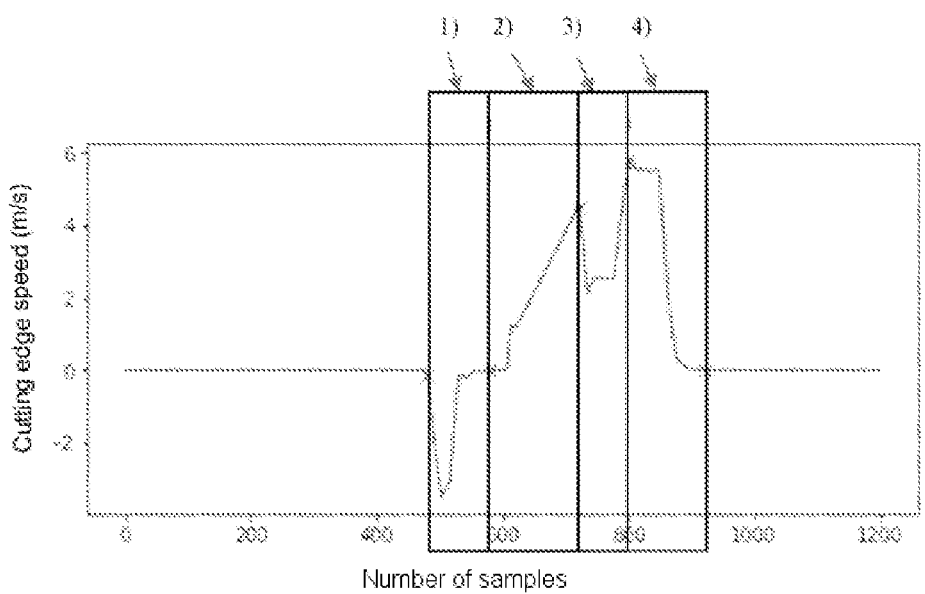
FIG. 2 is a schematic diagram of multiple sub-processes divided for a tail-cutting stage according to a preferred embodiment of the present invention.

Thus, in the case of the tail-cutting process, preferably, this can be further divided into the following multiple sub-processes according to the actual cutting edge speed curve: 1) a cutting edge preparation process, 2) an acceleration/preparation process, 3) a cutting process, 4) a deceleration process. Specifically, in 1) the cutting edge preparation process, the cutting edge enters a position of being ready to cut the tail portion of the plate billet (this position is generally quite high, and movement in the opposite direction to cutting will occur when the cutting edge position is adjusted, thus a negative value of speed will occur in the part marked 1) in FIG. 2); in 2) the acceleration preparation process, the cutting edge is accelerated by the cutting edge driving means and is about to cut the tail portion of the plate billet; in 3) the cutting process, the cutting edge contacts and cuts into the plate billet, and then cuts through and leaves the plate billet; and in 4) the deceleration process, the cutting edge moving at high speed is decelerated, for use in the next cutting, or stops operating. An example of such division is shown in FIG. 2.

According to the principles of the present invention, those skilled in the art will understand that the aim of further dividing the cutting stages (the head-cutting stage and/or tail-cutting stage) minutely as described above is to divide the cutting stages into multiple characterized sub-processes according to the characteristics of the crank flying shear process, with each sub-process corresponding to a different cutting edge behaviour or action. Thus, it should also be understood that the cutting stages can be divided into sub-processes in different ways for different plate billets, cutting objectives, process conditions, and characteristics of the crank flying shear device itself, etc., with no restriction to the sub-processes mentioned above. For example, it is possible to divide the cutting stages into different numbers of sub-processes, and divide the cutting stages into sub-processes according to different time intervals, etc. It should also be understood that although the present invention divides two cutting stages, specifically the head-cutting stage and tail-cutting stage, into sub-processes and applies the monitoring method described below thereto, it is also possible, depending on requirements, to divide the head-cutting stage alone into sub-processes and apply the monitoring method thereto, or divide the tail-cutting stage alone into sub-processes and apply the monitoring method thereto.

After the division, as described above, of the cutting stages of the crank flying shear process and the sub-processes thereof, it is possible, for already obtained actual data of parameters related to the crank flying shear process and for one or more of the multiple sub-processes, to further compare the actual data of the parameters with typical data of the parameters, in order to estimate an abnormality risk.

Based on the research of the present invention, the actual speed of the cutting edge, vibration data of the cutting edge driving means, lubricant data of the lubrication system, and current data of the motor of the cutting edge driving means generally play an important role in the monitoring and judgement of faults in the crank flying shear device or process. The monitoring method of the present invention will also be described below for these parameters.

According to an embodiment of the present invention, preferably, a clustering analysis method is used to determine typical crank flying shear process conditions, and typical data of the parameters related to the crank flying shear process is obtained according to the typical crank flying shear process conditions. For example, using certain historical data (3 months of data are commonly used for example), operation conditions of plate billets in the crank flying shear process are subjected to clustering analysis; these operation conditions include but are not limited to variables such as plate billet movement speed, plate billet material, processing temperature and plate billet thickness. Furthermore, it is also possible to subject these variables to normalization before they are inputted, to normalize all variables to the interval [0,1]. The result of clustering analysis will obtain multiple relatively stable typical process types. Different process types correspond to different plate billet conditions, so it is possible to determine the typical data of the parameters related to the crank flying shear process.

For example, typical data of the parameters can be obtained on the basis of control signals of the crank flying shear device and historical data from a process data system such as an Iba or from other additional sensors. Different abnormality detection models can then be constructed according to different plate billet conditions (as described below). The specific clustering algorithm used in the present invention can be any commonly used clustering analysis algorithm, including but not limited to K-means, DBSCAN, BIRCH, etc.

An abnormality detection method is used to independently construct abnormality detection models for different plate billet conditions obtained as above; an input of the abnormality detection model is normal process fluctuation data under different plate billet conditions (data in the absence of device and process faults). 1-3 months of normal process fluctuation data is generally needed, and this data can be used to construct a data distribution model under normal process conditions. Based on this distribution model, it is also possible to identify the probability of a device state; when a device state with a low probability occurs, this is detected as being abnormal.

Exemplary method steps for using the abnormality detection model to perform abnormality detection and fault judgement comprise for example: firstly, pre-processing the obtained actual data of parameters related to the crank flying shear process; then chronologically synchronizing all data with the sub-processes of the head-cutting stage and/or tail-cutting stage mentioned above, and normalizing the actual data of the parameters for all of the different sub-processes 1)-4) in the head-cutting stage and tail-cutting stage, i.e. synchronizing the actual data of the parameters according to the time scale, so as to correspond correctly to the cutting stages and the sub-processes thereof; and then, based on already obtained typical data of the parameters, calculating the deviation between the actual data and typical data of the parameters. It should be understood that any deviation vector distance calculation method can be used as a method for calculating the deviation, e.g. Euclidean distance, vector cosine, K-L divergence, etc.

Further preferably, deviation vectors of multiple sub-processes can also be combined, to obtain a characteristic vector for abnormality detection. For example, after obtaining a deviation mode in the cutting-in process and cutting-away process mentioned above, it is further possible to distinguish between cutting edge wear and poor cutting faults.

Finally, it is also possible to construct an abnormality detection model on the basis of the abnormality detection characteristic vector, including a simple threshold model, a trend threshold model, and a model based on multi-parameter abnormality diagnosis, such as a One Class model, a MSET (multivariate state estimation technique), etc.

For unstable and intermittent operating conditions, it is possible to detect and judge abnormality risks, and even determine the causes of faults, by subjecting the cutting edge speed to the abovementioned division and processing. Specifically, the actual cutting edge speed curve is used as actual data of the parameters in the method described above, and a typical cutting edge speed curve is used as typical data of the parameters.

The typical cutting edge speed curve can generally be obtained from a cutting edge drive control signal, e.g. a control reference curve can be obtained on the basis of a drive signal for controlling the cutting edge speed, to serve as a typical cutting edge speed curve; or in the absence of such a control reference curve, a typical cutting edge speed curve for certain operating conditions can be calculated on the basis of historical data and experience, e.g. obtained by a method such as multiple averages. Such a typical cutting edge speed curve represents the speed curve which the cutting edge should follow under normal operating conditions.

The actual cutting edge speed curve is strongly dependent on the operation conditions of the plate billet being processed, such as plate billet material, temperature, movement speed and thickness, etc. Using the abovementioned clustering analysis method and abnormality detection method, it is possible to obtain the deviation between the actual cutting edge speed curve and the typical cutting edge speed curve for the multiple sub-processes separately, and thereby estimate the abnormality risk. Moreover, the abnormality risk can also be specifically calculated by performing a comparison with a cutting edge speed deviation distribution in a normal state. The cutting edge speed deviation distribution in the normal state is the probability distribution of normal speed deviation fluctuation in the absence of device and process faults. When a device or process fault is present, the actual cutting edge speed curve and typical cutting edge speed curve will have an abnormal deviation that deviates significantly from such normal deviation fluctuation, so it is then possible to calculate the abnormality risk on the basis of such an abnormal deviation, and even determine the cause of a fault. Thus, it could be said that the deviation between the actual cutting edge speed curve and typical cutting edge speed curve reflects the overall systemic response to crank flying shear device and process faults.

For large transient impact situations, the present invention also proposes combining the abovementioned division of the crank flying shear process with the detection of cutting edge driving means vibration, in order to perform fault diagnosis.

According to a preferred embodiment, for example, a vibration sensor is installed at a suitable position of the cutting edge driving means, in order to obtain vibration data of an associated component. The cutting edge driving means of the crank flying shear device may comprise a driver or any other suitable driving device. For example, the driver may comprise a drive motor, a gearbox and a drive shaft, etc., so vibration sensors can be installed at the drive motor, gearbox and/or drive shaft, so as to obtain vibration data of the associated component. Further preferably, a vibration sensor can also be installed on a gearbox high-speed shaft of the driver, such that the installation position of the vibration sensor is remote from a cutting region. It should be understood that the vibration data for example includes but is not limited to all vibration-related original data and extracted characteristic data, such as acceleration frequency, envelope frequency, vibration amplitude, fault frequency, etc.

In this case, the actual data of the parameters in the method described above further comprises actual vibration data from the cutting edge driving means, and typical data of the parameters comprises a typical vibration state monitoring index. Thus, using the abovementioned clustering analysis method and abnormality detection method, it is possible to obtain the deviation between the actual vibration state monitoring index and the typical vibration state monitoring index for the multiple sub-processes.

Specifically, a vibration data collection process needs to be synchronized in time with the distributed control system; using such a synchronization technique, a correspondence can thereby be established between the actual vibration data and the abovementioned cutting stages and sub-processes thereof. Thus, using the vibration data in the cutting stages and sub-processes thereof, and by analysing the vibration data, a vibration state monitoring index related to device and process faults is obtained. The vibration state monitoring index for example includes but is not limited to: total vibration, vibration peak-to-peak value, tooth fault frequency, bearing fault frequency, drive motor rotation speed, vibration waveform envelope spectrum (ENV) and vibration harmonics thereof, etc. Thus, similar to the cutting edge speed parameter, according to the method described above, a typical vibration state monitoring index in a normal state can be obtained. Thus, by comparing the actual vibration state monitoring index with the typical vibration state monitoring index, the deviation therebetween can be obtained.

For example, the peak-to-peak value in the cutting-in process of the head-cutting stage is used to monitor a transient impact. As another example, a special deviation mode of the ENV in the deceleration process of the head-cutting stage and/or tail-cutting stage can be used to monitor faults in gear teeth and bearings in the gearbox and motor.

According to a further preferred embodiment of the present invention, for example, it is further possible, as required, to collect various other parameters related to the crank flying shear process, e.g. obtain data of additional parameters from sensors additionally provided for various other components, and process these data with reference to the abovementioned clustering analysis method and abnormality monitoring method, and obtain the deviation between the actual data and typical data of the relevant parameters; and in accordance with corresponding logic, estimate the abnormality risk and determine the precise cause of the fault.

For example, lubricant data and motor current data of the cutting edge driving means can similarly be monitored. Preferably, the lubricant injection amount, lubricant high/low pressures and/or lubricant supply frequency, etc. can be additionally measured, for combination with the abovementioned speed deviation to identify potential faults in crank bearings. For example, the shape of the actual cutting edge speed curve can further be combined with an estimated drive power of the motor (calculated from the motor current) to estimate a typical cutting load, for use in the judgement of faults.

Specifically, similar to the method implemented for cutting edge speed and vibration data, according to a preferred embodiment, the actual data of the parameters further comprises actual lubricant data from the lubrication system of the crank flying shear device, and this actual lubricant data comprises a lubricant flow rate, lubricant pressure, and/or lubricant supply frequency; typical data of the parameters comprises a typical lubricant state monitoring index of the lubrication system, i.e. typical values of lubricant flow rate, lubricant pressure and/or lubricant supply frequency, etc. in a normal state. Thus, a monitoring method for lubricant data comprises: chronologically synchronizing the actual lubricant data with the multiple sub-processes; obtaining an actual lubricant state monitoring index on the basis of the actual lubricant data; for the multiple sub-processes, comparing the actual lubricant state monitoring index with the typical lubricant state monitoring index, so as to obtain the deviation therebetween.

According to another preferred embodiment, similar to the method implemented for cutting edge speed and vibration data, the actual data of the parameters further comprises actual current data from the motor of the cutting edge driving means of the crank flying shear device, and the typical data of the parameters comprises a typical current state monitoring index, i.e. a typical value of motor current in a normal state. Thus, a monitoring method for current data comprises: chronologically synchronizing the actual current data with the multiple sub-processes; obtaining an actual current state monitoring index on the basis of the actual current data; for the multiple sub-processes, comparing the actual current state monitoring index with the typical current state monitoring index, so as to obtain the deviation therebetween.

Figure 3:
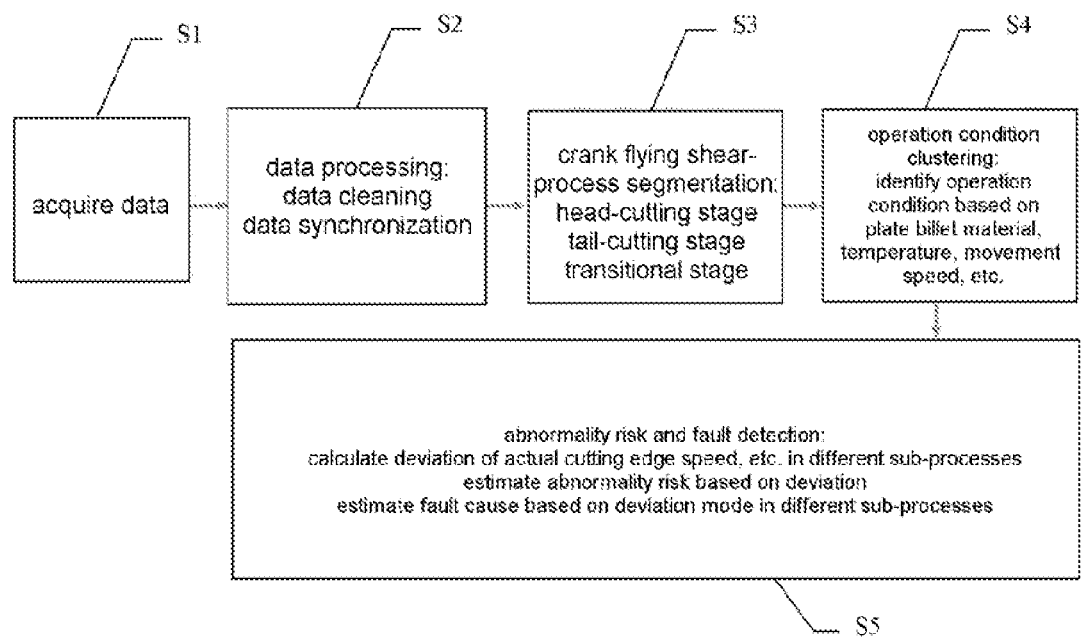
FIG. 3 is a flow chart of an exemplary monitoring method according to a preferred embodiment of the present invention.

FIG. 3 shows schematically a flow chart of an exemplary crank flying shear monitoring method according to a preferred embodiment of the present invention; this monitoring method combines fault monitoring for situations such as unstable and intermittent operating conditions and large transient load impacts, as described above.

Specifically, in step S1, actual data of relevant parameters is acquired from an iba system or any other crank flying shear process data collection system and associated sensors (e.g. a vibration sensor, lubricant sensor, current sensor, etc.), e.g. a control signal, vibration data, cutting edge speed data, lubricant data or motor current data, etc., as mentioned above. In step S2, the actual data of the relevant parameters is subjected to data cleaning, to delete abnormal data, and an interpolation method is used to complement the data, then the actual data of the parameters is subjected to the synchronization described above. In step S3, an actual cutting edge speed curve is obtained on the basis of the actual cutting edge speed data, and sub-processes of the head-cutting stage and/or tail-cutting stage are accordingly determined.

In step S4, a process type for the plate billet being processed is determined by the clustering method described above, so as to determine typical data of the relevant parameters. In step S5, an abnormality detection model is constructed, so as to calculate the deviation between the actual data and typical data of the relevant parameters in the different sub-processes of the head-cutting stage and/or tail-cutting stage; it is thereby also possible to obtain the deviation vector mentioned above, and it is then also possible to estimate an abnormality risk on the basis of the deviation/deviation vector, and/or estimate the cause of a fault on the basis of a deviation mode corresponding to the deviation vector.

It should be understood that although the above steps are performed in the order S1-S5, in other preferred embodiments it is possible to omit, add or change steps and the order thereof according to the actual requirements of the device and process, etc. For example, there is no strict sequential relationship between step S3 and step S4, which can be interchanged or performed in parallel.

The table below is a fault diagnosis table for an exemplary monitoring method according to the present invention. As can be seen in table 1, it is possible to accurately identify the cause of a fault on the basis of the deviation mode/state monitoring index, etc. of different stages/sub-processes.

TABLE 1

| Cause of fault | Deviation mode/state monitoring index |
| --- | --- |
| Crank bearing | large deviation in actual cutting edge speed in acceleration/preparation process or deceleration process of head-cutting stage and/or tail-cutting stage small lubricant injection amount large deviation in high/low pressure of lubricant (corresponding to blockage or leakage fault) |
| Cutting edge wear | large deviation in actual cutting edge speed in cutting-in process of head-cutting stage medium/quite large deviation in actual cutting edge speed in cutting-through process of head-cutting stage high vibration (peak-to-peak value) present at cutting edge driving means high transient power of motor of cutting edge driving means (obtained from motor current) |
| Poor cutting | large deviation in actual cutting edge speed in cutting-through process of head-cutting stage |
| Gearbox | vibration ENV has special fault mode in deceleration |

TABLE 1-continued

| Cause of fault | Deviation mode/state monitoring index |
|---|---|
| | process of tail-cutting stage (corresponding to bearing fault or gear tooth fault) |
| Motor | special vibration mode present at cutting edge driving means (obtained on the basis of vibration data, corresponding to motor fault, shaft fault, stator fault, rotor fault, bearing fault, etc.) |
| | high sensed value of temperature sensor |

It should be understood that according to the principles of the present invention, the minute segmentation of the flying shear process can be adjusted as required on the basis of differences in the flying shear process of different customers, devices and processes. The fault diagnosis table above is merely one example; adjustments can be made according to machine components and additional sensors selected thereby.

The present invention realizes many advantages. Firstly, it achieves crank flying shear region stage monitoring and diagnosis. Secondly, the principles of the present invention can also be scaled up to develop a solution for an entire hot-rolling machine process device. Thirdly, the method of the present invention can also be adjusted to suit other applications requiring the combination of state monitoring data and process data. Fourthly, the lifespan of a cutting edge of a crank flying shear cutter can be monitored, to recommend a suitable replacement time; this helps to reduce the shutdown time of the system, otherwise huge maintenance costs will be engendered.

Demonstrative modes of implementation of the solution proposed herein have been described in detail above with reference to preferred embodiments, but those skilled in the art will understand that on condition that there is no deviation from the concept of the present disclosure, various changes and alterations can be made to the particular embodiments above, and the various technical features and structures proposed herein can be combined in various ways, without exceeding the scope of protection of the present disclosure, said scope being determined by the attached claims.

The invention claimed is:

1. A monitoring method for a plate billet crank flying shear process, the method comprising:
acquiring a control signal of a control system of a crank flying shear device, and determining a cutting stage of the crank flying shear process according to the control signal;
obtaining an actual cutting edge speed curve in the cutting stage, and further dividing the cutting stage into multiple sub-processes according to the actual cutting edge speed curve;
obtaining actual data of a parameter related to the crank flying shear process, and for one or more of the multiple sub-processes, separately comparing the actual data of the parameter with reference data of the parameter, in order to estimate an abnormality risk of a crank flying shear device used in the plate billet crank flying shear process.

2. The monitoring method according to claim 1, wherein the cutting stage comprises a head-cutting stage for cutting a head portion of the plate billet, and the head-cutting stage is further divided into the following multiple sub-processes according to the actual cutting edge speed curve: 1) an acceleration/preparation process, 2) a cutting-in process, 3) a cutting-away process, and 4) a deceleration process.

3. The monitoring method according to claim 2, wherein an operating condition in the crank flying shear process is obtained, and the operation condition is subjected to clustering analysis to obtain a reference crank flying shear process condition;
reference data of the parameter is obtained according to the reference crank flying shear process condition;
wherein the operation condition comprises plate billet movement speed, plate billet material, processing temperature and plate billet thickness.

4. The monitoring method according to claim 3, wherein the actual data of the parameter comprises the actual cutting edge speed curve, and the reference data of the parameter comprises a reference cutting edge speed curve;
deviations between the actual cutting edge speed curves and the reference cutting edge speed curves are obtained for the multiple sub-processes;
the abnormality risk is estimated according to the deviation.

5. The monitoring method according to claim 4, wherein each of the deviations between the actual cutting edge speed curves and the reference cutting edge speed curves are compared with reference cutting edge speed deviation distributions respectively, in order to calculate the abnormality risk.

6. The monitoring method according to claim 4, further comprising:
calculating deviation vector of the deviations;
combining the deviation vectors in the multiple sub-processes, to obtain a characteristic vector; and
determining a fault cause on the basis of the characteristic vector.

7. The monitoring method according to claim 3, wherein the actual data of the parameter comprises actual vibration data from a cutting edge driver of the crank flying shear device, and the reference data of the parameter comprises a reference vibration state monitoring index of the cutting edge driver;
the monitoring method further comprises:
chronologically synchronizing the actual vibration data with the multiple sub-processes;
obtaining an actual vibration state monitoring index according to the actual vibration data;
comparing the actual vibration state monitoring index with the reference vibration state monitoring index for the multiple sub-processes, in order to obtain a deviation therebetween.

8. The monitoring method according to claim 7, wherein the cutting edge driver comprises a drive motor, a gearbox and a drive shaft, and wherein the vibration data is vibration data for at least one of the drive motor, gearbox and drive shaft.

9. The monitoring method according to claim 3, wherein the actual data of the parameter further comprises actual lubricant data from a lubrication system of the crank flying shear device, the actual lubricant data being a selected one from a group consisted of a lubricant flow rate, a lubricant pressure and a lubricant supply frequency, and the reference data of the parameter comprises a reference lubricant state monitoring index of the lubrication system; the monitoring method further comprises:
chronologically synchronizing the actual lubricant data with the multiple sub-processes;
obtaining an actual lubricant state monitoring index according to the actual lubricant data; and comparing the actual lubricant state monitoring index with the reference lubricant state monitoring index for the multiple sub-processes, in order to obtain a deviation therebetween.

10. The monitoring method according to claim 3, wherein the actual data of the parameter further comprises actual current data from a motor of a cutting edge driver of the crank flying shear device, and the reference data of the parameter comprises a reference current state monitoring index; the monitoring method further comprises:
chronologically synchronizing the actual current data with the multiple sub-processes;
obtaining an actual current state monitoring index according to the actual current data; and
comparing the actual current state monitoring index with the reference current state monitoring index for the multiple sub-processes, in order to obtain a deviation therebetween.

11. The monitoring method according to claim 1, wherein the cutting stage comprises a tail-cutting stage for cutting a tail portion of the plate billet, and the tail-cutting stage is further divided into the following multiple sub-processes according to the actual cutting edge speed curve: 1) a cutting edge preparation process, 2) an acceleration/preparation process, 3) a cutting process, and 4) a deceleration process.

12. The monitoring method according to claim 1, wherein the cutting stage comprises a head-cutting stage for cutting a head portion of the plate billet, and the head-cutting stage is further divided into the following multiple sub-processes according to the actual cutting edge speed curve: 1) an acceleration/preparation process, 2) a cutting-in process, 3) a cutting-away process, and 4) a deceleration process; and
wherein the cutting stage comprises a tail-cutting stage for cutting a tail portion of the plate billet, and the tail-cutting stage is further divided into the following multiple sub-processes according to the actual cutting edge speed curve: 1) a cutting edge preparation process, 2) an acceleration/preparation process, 3) a cutting process, and 4) a deceleration process.

* * * * *